(12) United States Patent
Inoue et al.

(10) Patent No.: US 6,518,714 B2
(45) Date of Patent: Feb. 11, 2003

(54) FLASH LAMPS FOR UNDERWATER PHOTOGRAPHY

(75) Inventors: Akihide Inoue, 3-9-6 Dai, Kamakura, Kanagawa 247 (JP); Yoshiyuki Takematsu, 8-8-14-303 Nishigotanda, Shinagawa-ku, Tokyo 141 (JP)

(73) Assignees: Akihide Inoue, Kanagawa (JP); Yoshiyuki Takematsu, Tokyo (JP)

( * ) Notice: Subject to any disclaimer, the term of this patent is extended or adjusted under 35 U.S.C. 154(b) by 60 days.

(21) Appl. No.: 09/782,141

(22) Filed: Feb. 12, 2001

(65) Prior Publication Data

US 2001/0007414 A1 Jul. 12, 2001

(30) Foreign Application Priority Data

Feb. 18, 2000 (JP) .......................... 2000-042046

(51) Int. Cl.$^7$ .................. H05B 41/16; H05B 41/24; G03B 17/08
(52) U.S. Cl. .............. 315/241 P; 315/282; 315/277; 396/28
(58) Field of Search ............... 315/241 P, 149, 315/277, 282, 151, 219, 241 R, 362, 157; 396/28, 25, 267

(56) References Cited

U.S. PATENT DOCUMENTS

| | | | | |
|---|---|---|---|---|
| 3,711,741 A | * | 1/1973 | Akiyama et al. | 315/241 P |
| 3,786,734 A | * | 1/1974 | Long et al. | 396/28 |
| 3,952,190 A | * | 4/1976 | Perkins | 362/4 |
| 4,252,426 A | * | 2/1981 | Kuraishi | 396/189 |
| 4,653,883 A | * | 3/1987 | Maeno | 396/177 |

* cited by examiner

Primary Examiner—Don Wong
Assistant Examiner—Chuc Tran
(74) Attorney, Agent, or Firm—Beyer Weaver & Thomas LLP

(57) ABSTRACT

A flash lamp for underwater photography has at least two straight discharge tubes mounted to a panel perpendicularly to each other in a T-form or an L-form such that a circular target area can be illuminated. A plurality of smaller capacitors and transformers for these discharge tubes can be arranged inside a watertight housing in a space-efficient manner. The mode switching circuit for selecting between automatic and manual modes of operation is designed such that a single mode selecting switch needs to be operated in order to select a mode. A slave flash lamp has a more reliable control circuit having one or two light receiving circuits for detecting light from a master and outputting a corresponding light sensing signal, a start signal output circuit and a stop signal output circuit for analyzing the received light signal and analyzing it to detect start and stop signal elements and to output a start signal and a stop signal for causing flash light to start emission and to stop it.

19 Claims, 15 Drawing Sheets

Va

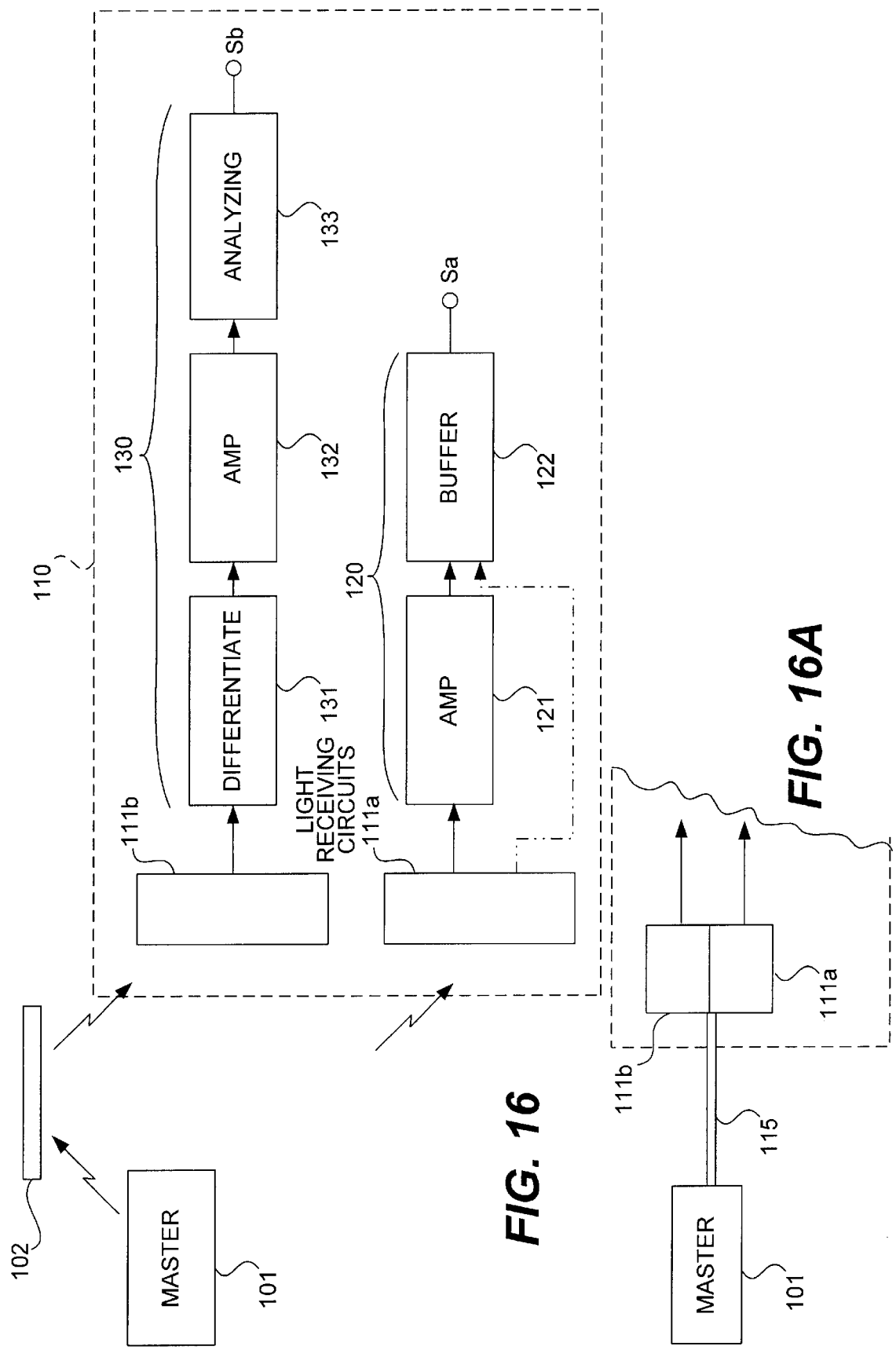

FLASH LAMPS FOR UNDERWATER PHOTOGRAPHY

BACKGROUND OF THE INVENTION

This invention relates to flash lamps for underwater photography, inclusive of so-called "slaves" which emit light when a so-called "master" is caused to flash.

Flash lamps are essential in underwater photography both because red light is more easily absorbed by water to cause a color imbalance and because there is usually not enough natural light available. Flash lamps for underwater photography are usually supported at the tip of a flexible arm attached to the camera housing and are frequently oriented obliquely in order to avoid direct reflection of light from plankton and other small animals in the environment. In order to illuminate an approximately rectangular target area while the lamp is obliquely oriented, the lamp is usually required to be able to illuminate an approximately circular area around its optical axis. Prior art flash lamps for underwater photography, therefore, were usually provided with a circularly shaped discharge tube or arrays of prisms arranged over a rectangular panel, in order to illuminate a nearly circular area. A circularly shaped discharge tube for emitting a sufficiently large quantity of light is necessarily large and costly and further requires an equally large reflector, thereby making the lamp unit bulky as a whole. As for lamps with a large number of light-diffusing prisms, means for causing uniformly oriented light to make incidence from behind onto the prism-supporting panel must be provided and this again makes the lamp unit bulky as a whole.

Another unfavorable characteristic of prior art flash lamps for underwater photography has been that a single capacitor with a large capacitance was used for the discharge and a single large transformer was used for operating such a capacitor. Such large electronic components cannot be effectively mounted to a base board to make a compact lamp unit. While miniaturized cameras are coming to be available, flash lamp units for underwater photography remained as large as ever.

Still another unfavorable characteristic of prior art flash lamps for underwater photography relates to the mode switching circuit for switching between the so-called "automatic" and "manual" modes of controlling the exposure. The automatic mode is the mode of operation in which the light emission is terminated automatically when it is ascertained that a specified quantity of light has been emitted, say, by monitoring the reflected light received through the lens of the camera. The manual mode is the mode of operation in which the exposure is manually set by the photographer. In this mode, the photographer may still select whether the light from the lamp is to be used fully or the emission should be stopped at a specified time such that the quantity of emitted light will be a specified fraction, such as ½ or ¼, of a full exposure. As will be explained in detail below, the prior art switching circuit was bulky, including not only the so-called mode selection switch by which the photographer will select either the automatic or manual mode of exposure but also another switch which was necessary to carry out the switching between the two modes.

This invention relates also to an improved slave lamp of the type which is caused to emit light in synchronism with the light emission from a master lamp. Such a slave lamp comprises a light receiving circuit including at least one light receiving element for receiving light from the master and a signal processing circuit for detecting a start signal element and a stop signal element from the light sensing signal outputted from the light receiving circuit in response to the light received from the master and outputting a start signal and a stop signal respectively for starting and ending emission of flash light from a discharge tube of its own. Explained more in detail, as a start signal element is detected by analyzing the light sensing signal from the light receiving circuit and a start signal is outputted from the signal processing circuit, a trigger circuit for operating the discharge tube is activated. This light sensing signal is also differentiated within the signal processing circuit, and when a stop signal element is detected by differentiating the light sensing signal, a light emission stopping circuit is activated to stop the emission of light from the discharge tube. The light receiving element of such light receiving circuit is usually connected to a low-load resistor in order to prevent saturation because it serves to receive strong flash light with high intensity. As a result, when the light sensing signal from the light receiving circuit is differentiated, the differential signals thus obtained are from several to several tens of millivolts and hence an amplifier becomes necessary. The amplifier and its accessory devices make the flash unit bulky. In addition, the amplifier will amplify noise and other signals not intended to be amplified, thereby increasing the tendency to cause erroneous operations.

There have been problems of other kinds with prior art slave lamps. Since the light receiving element of the light receiving circuit for a slave lamp is generally disposed proximally to the reflective mirror of the discharge tube so as to be able to receive light from the master more effectively, the noise which is generated at the time of triggering the discharge tube is also received through the reflective mirror by the light receiving element and is amplified together with the light sensing signal. Since the high trigger voltage applied to the discharge tube is usually applied electrostatically on the outer surface of the discharge tube in order to activate it, the applied voltage is not completely absorbed by the discharge tube but comes to be discharged in part in air and also into the wiring and the electronic components on printed circuit boards. Such noise may not be harmful to a start signal for starting light emission but, if it contaminates the stop signal, may stop the light emission immediately after the discharge tube begins to emit light.

SUMMARY OF THE INVENTION

It is therefore an object of this invention to provide a flash lamp for underwater photography which is compact and light in weight but is still capable of illuminating an approximately circular target area with a relatively large quantity of light.

It is another object of this invention to provide a flash lamp for underwater photography having a compact but reliable mode switching circuit for switching between automatic and manual modes of exposure.

It is still another object of this invention to provide a slave flash lamp having an improved signal processing circuit with a simpler structure for detecting start and end signal elements in a light sensing signals and outputting start and end signals such that emission of flash light from its discharge tube can be started and stopped reliably.

A flash lamp embodying this invention for underwater photography may be characterized as comprising two straight discharge tubes for emitting flash light mounted to a panel perpendicularly to each other, say, in a T-formation or an L-formation such that a circular target area can be illuminated. Since two relatively smaller tubes are used, instead of one large discharge tube bent in a circular form in the attempt to illuminate a circular target area with a large quantity of light, smaller capacitors and smaller transformers which are connected mutually parallel are sufficient and they can be mounted to a panel and a substrate more compactly and in a space-efficient manner inside a watertight housing.

In another aspect of this invention, the mode switching circuit for switching between automatic and manual modes of operation is simplified. With an improved mode switching circuit, only one mode selecting switch is required to be operated on such that an indicator lamp for indicating whether light emission has taken place in the automatic mode or not will function reliably.

A slave type flash lamp embodying this invention may be characterized not only as comprising a light receiving circuit for receiving light from a master flash lamp and outputting a light sensing signal according to the received light intensity and a signal processing circuit for analyzing this light sensing signal to output at appropriate times a start signal for causing flash light to be emitted from its own discharge tube and to stop this emission of light, but also wherein the signal processing circuit includes both a start signal output circuit and a stop signal output circuit for processing and analyzing the light sensing signal to accordingly output a start signal and a stop signal, respectively, for causing light emission from the discharge tube to be started and ended. The stop signal output circuit includes a differentiating circuit for differentiating the light sensing signal to output its differentials, an amplifying circuit for amplifying these differentials and a signal analyzing circuit which analyses the amplified differentials to detect a stop signal element, or a feature in the light sensing signal or its differentials which indicates that a stop signal is to be outputted to stop the emission of flash light. The start signal output circuit serves to analyze the amplified light sensing signal to detect a start signal element, or a feature in the light sensing signal which indicates that a start signal is to be outputted to start the emission of flash light. The light receiving circuit may be divided into two circuits each with its own light receiving element, one of them outputting its light sensing signal to the start signal output circuit and the other outputting its light sensing signal to the stop signal output circuit. In such a case, the two light receiving elements may be used separately or put in a same package. In order to prevent noise effects, the invention also teaches providing a bypass capacitor on the output side of the amplifier circuit in the stop signal output circuit.

BRIEF DESCRIPTION OF THE DRAWINGS

FIG. 16 is a block diagram of still another control circuit embodying this invention, and FIG. 16A is a portion of FIG. 16 when the circuit is adapted to receive a light signal in an alternative manner.

Equivalent or like components of different circuits may be indicated by the same symbols for the convenience of disclosure and may not necessarily be described repetitiously.

DETAILED DESCRIPTION OF THE INVENTION

Figure 1:
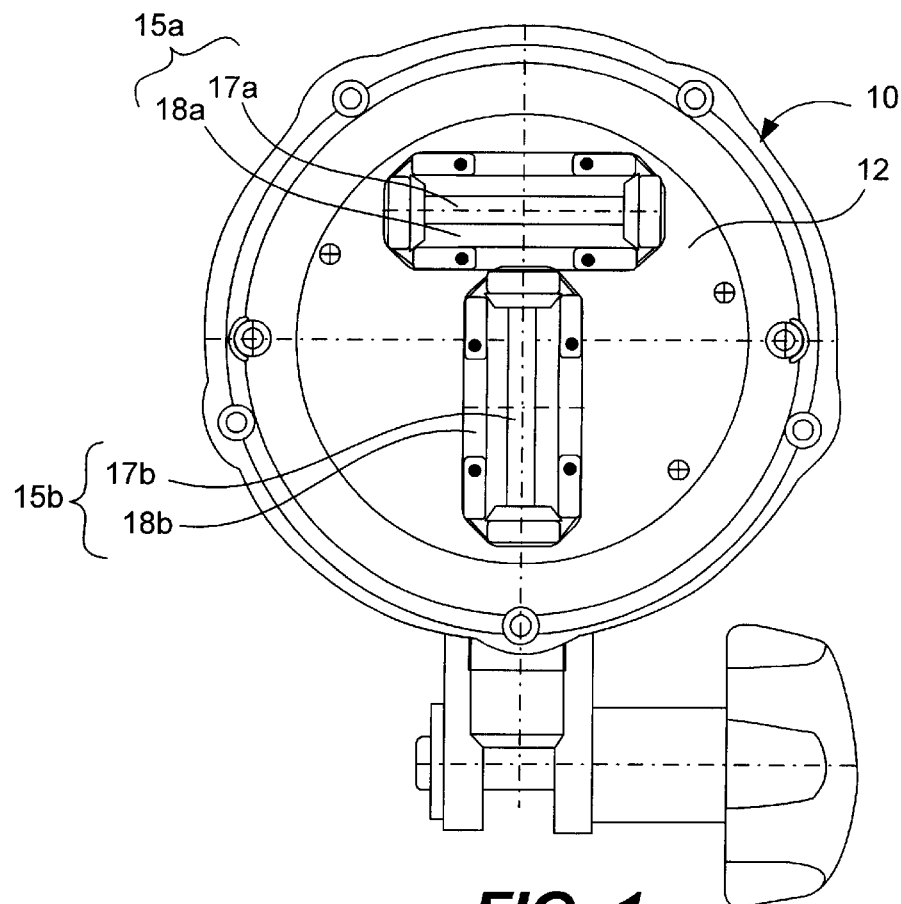
FIG. 1 is a front view of a panel of a flash lamp for underwater photography embodying this invention.

The invention is described next by way of examples with reference to drawings. FIG. 1 shows a flash lamp 10 embodying this invention with a panel 12 on which two light emitting units 15a and 15b are supported. Each of these units 15a and 15b has a flash discharge tube 17a or 17b and a reflector 18a or 18b behind it. These discharge tubes 17a and 17b are of an ordinary, straight kind and they are oriented perpendicularly to each other in a T-formation, that is, one of them (15a) disposed transversely across a line extended from the discharge tube (17b) of the other (15b). Although one may tend to suspect that two elongated discharge tubes thus oriented with respect to each other would illuminate a generally T-shaped target area, the present inventors' experiments have shown that an approximately circular target area can be illuminated by an arrangement as shown in FIG. 1.

Figure 2A:
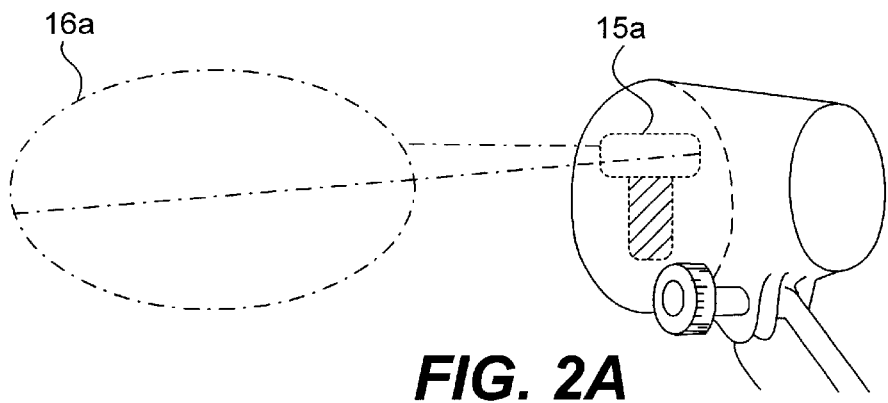
FIGS. 2A, 2B and 2C are sketches for showing the areas illuminated by the discharge tubes of FIG. 1 when they are discharged singly and together.
Figure 2B:
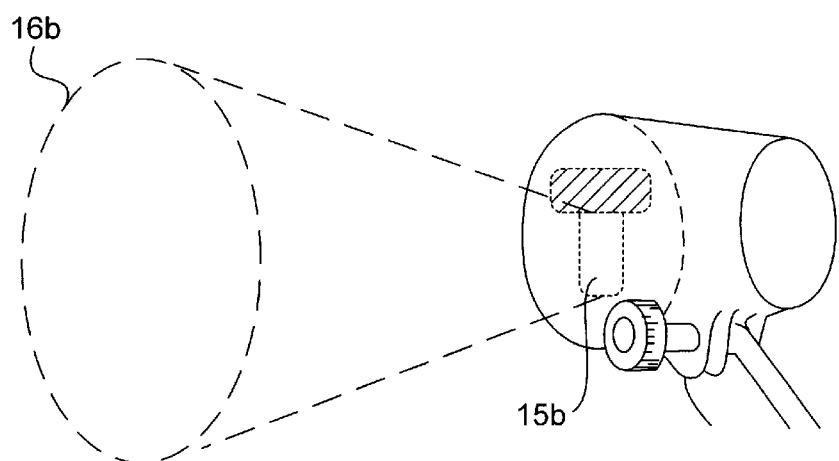
Figure 2C:
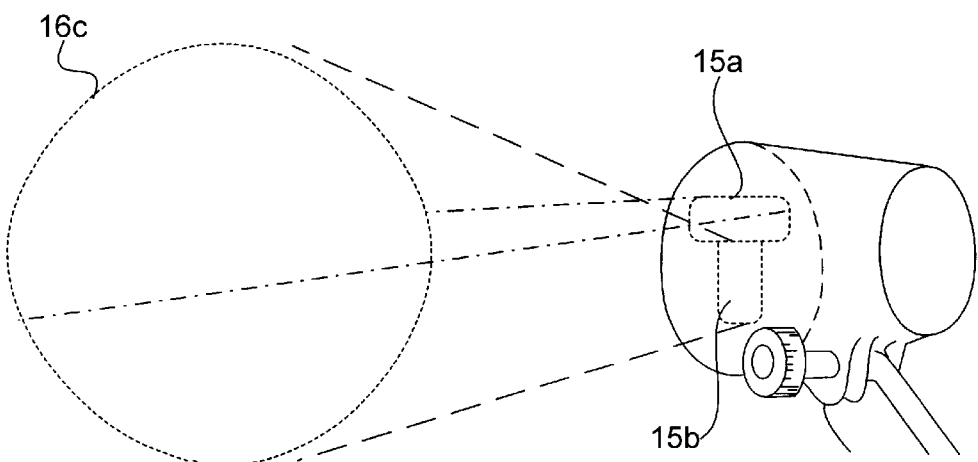

This can be explained as follows with reference to FIGS. 2A, 2B and 2C. Each of the straight discharge tubes 17a and 17b of the units 15a and 15b will illuminate an approximately elliptical target area 16a or 16b on a plane parallel to the panel 12, as shown in FIGS. 2A and 2B. If both of them are discharged together, the two elliptical areas 16a and 16b become superposed and an approximately circular area 16c is illuminated, as shown in FIG. 2C. Since the centers of the discharge tubes 17a and 17b, which are the centers of light emission of the light emitting units 15a and 15b, are separated by a distance of 1–2 cm, the two elliptical areas 16a and 16b are accordingly displaced by 1–2 cm one from the other. Since these ellipses 16a and 16b have axial distances in units of meters, however, a displacement on the order to 1–2 cm is practically negligible.

Although a lamp with two light emitting units placed in a T-formation has been illustrated above, an additional number of similar light emitting units may be incorporated, and the two light emitting units 15a and 15b may be disposed in an L-formation, although not separately illustrated in a drawing. As a result of thus using a plurality of light emitting units of a readily available straight kind, instead of a single unit with a large circularly formed discharge tube of an expensive kind, the load on the lamp and the generation of heat caused by the introduction of large power can be distributed among the plurality of units, and the lifetimes of the discharge tubes become longer. Moreover, a plurality of smaller components can be arranged more space-efficiently and compactly inside a housing, as shown in FIG. 3, than a single large component.

Figure 3:
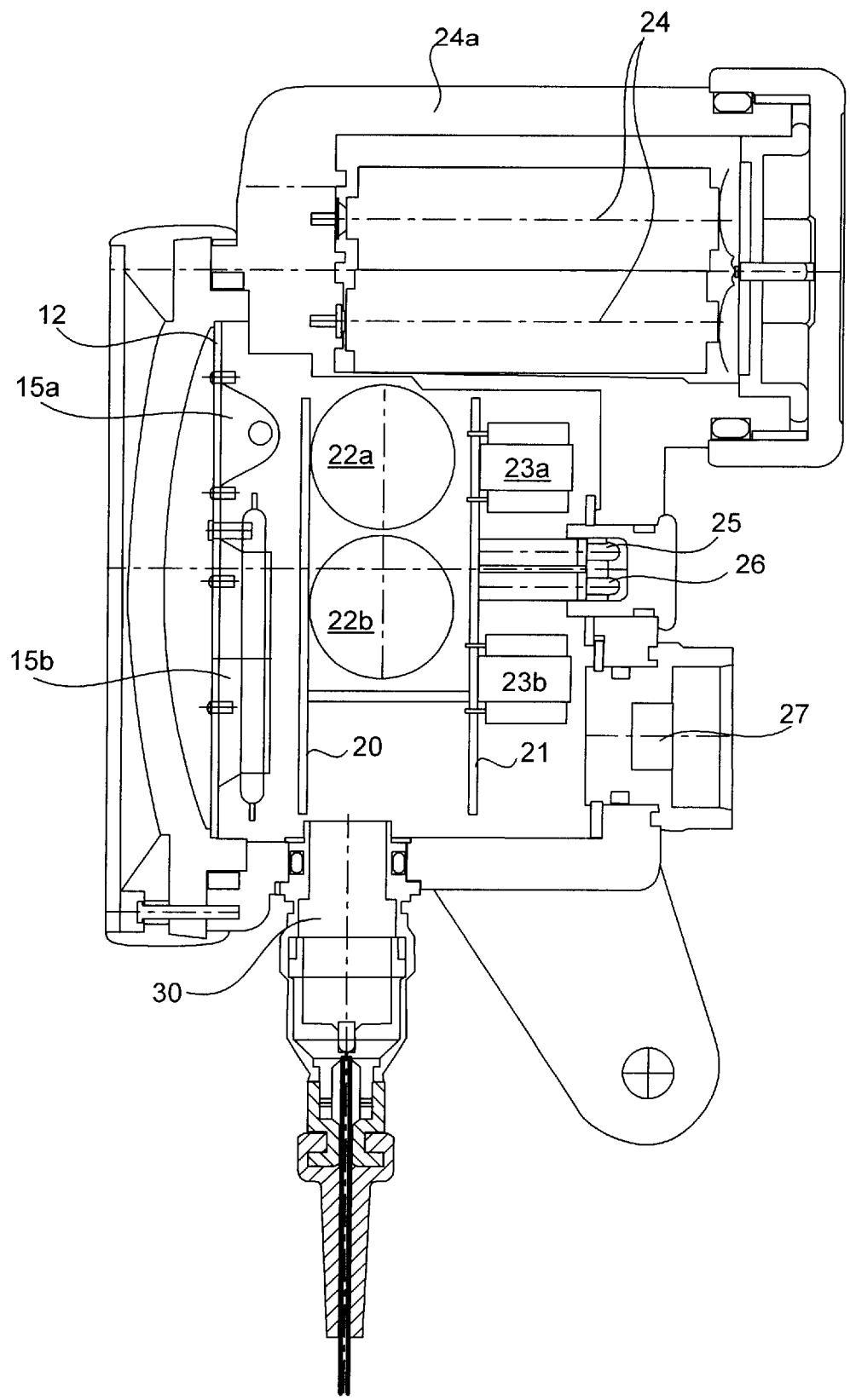
FIG. 3 is a sectional side view of the flash lamp of FIG. 1.

FIG. 3 shows the flash lamp 10 with its various components arranged inside a housing according to this invention. Two circular circuit boards 20 and 21 of about the same size as the panel 12, with diameters equal to about 6.5 cm, are disposed parallel to and behind the circular panel 12. Two smaller capacitors (about 2 cm in diameter and about 4.5 cm in length) 22a and 22b (instead of one larger capacitor, say, of about 3 cm in diameter and about 7 cm for a prior art flash lamp) are mounted to the first circuit board 20. Two smaller transformers (about 1.2 cm in height) 23a and 23b (instead of one larger transformer, say, of about 2 cm in height) are mounted to the second circuit board 21. A battery case 24, adapted to contain therein four cells parallel to one another as power source) is formed on one side, using an outer wall 24a of the housing as one of its walls to save both the space and the material. An LED 25 for indicating that emission of light has been completed in an automatic mode of operation, another LED 26 for indicating the completion of charging, an electrical connector terminal 29 for the connection of an electrical signal cable and an optical connector terminal 30 for the connection of an optical cable are on the outer surface of the lamp housing. It is to be noted in particular that the capacitors 22a and 22b are mounted so as to extend perpendicularly to the direction of light emission by the lamp 10. Thus, the required length (in the left-right direction in FIG. 3) of the lamp housing is not controlled by the length (about equal to 7 cm) of the capacitors 22a and 22b but by the lengths (about equal to 4.8 cm) of the cells to be stored inside the battery box case 24.

Figure 4:
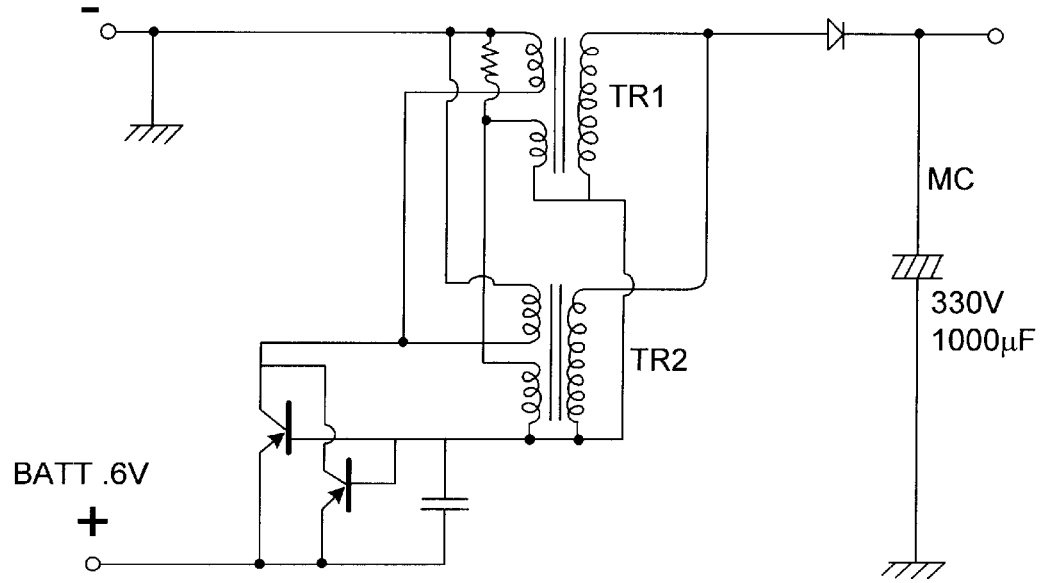
FIG. 4 is a diagram of a charge-discharge circuit for the two transformers of the flash lamp of FIG. 3.

The two smaller transformers 23a and 23b of FIG. 3 may be connected in parallel as shown in FIG. 4 to two transistors 28a and 28b. This connection serves to reduce the total resistance of the transformer coils, allowing a stronger current to be supplied. It was found experimentally to take about 3 seconds to charge a large capacitor of 330V and 1000 microfarad from 50V to 260V by using four NiCd cells as a power source with the aforementioned prior art transformer. In contrast, it was found to take only 2.4 seconds by the circuit shown in FIG. 4. Since speed is an important factor in underwater photography because of sudden changes in the conditions, it is extremely important to be able to charge the capacitor quickly.

Figure 5:
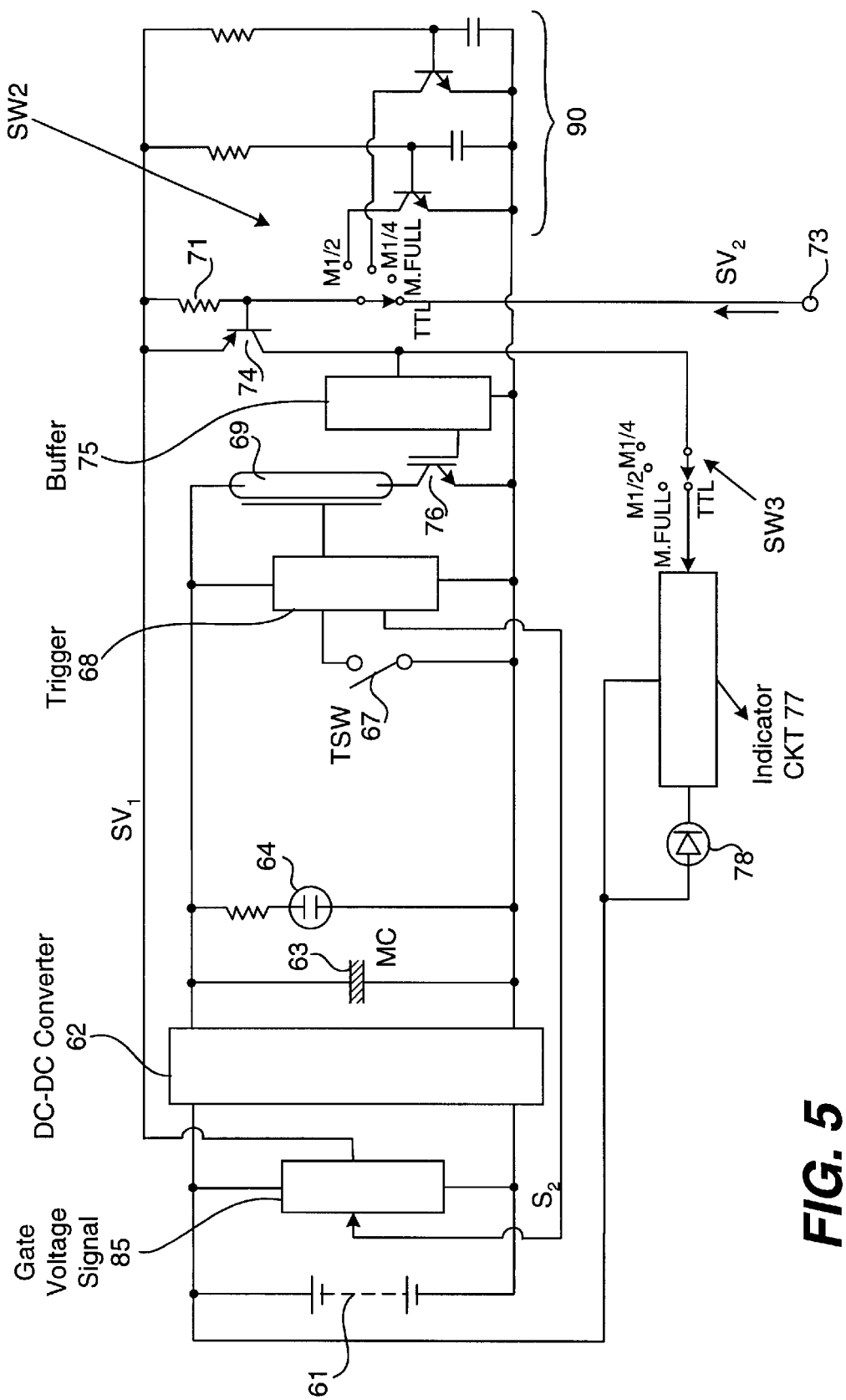
FIG. 5 is a circuit diagram of a prior art mode selecting circuit for a flash lamp.

The invention relates also to the mode switching circuit for a flash lamp for selecting between automatic and manual modes of operation. For the completeness of disclosure of the present invention, an example of prior art circuit of this purpose is explained first with reference to FIG. 5. Broadly explained, FIG. 5 shows a prior art mode switching circuit having a mode selecting switch SW2 between an automatic mode operation part adapted to be activated when the automatic mode is selected and a manual mode operation part 90 adapted to be activated when the manual mode is selected. Numeral 63 indicates a main capacitor (MC) which is charged by converting the voltage from a voltage source (cells) 61 to a high voltage of up to about 330V by means of a DC-DC converter 62. Numeral 69 indicates a discharge tube for emitting flash light. As the voltage of the main capacitor 63 reaches a certain level such as about 260V, a neon lamp 64 (commonly referred to as the "ready lamp") becomes lit to indicate that the flash lamp is ready to be used. If a trigger switch (TSW) 67, connected to the camera, is thereafter switched on, a trigger circuit 68 generates a high-voltage pulse of about 3000V and causes the discharge tube 69 to emit light. Numeral 76 indicates an insulated gate bipolar transistor (IGBT), which remains in the ON condition during this operation.

In synchronism with the trigger circuit 68, signal S2 is generated and inputted to a gate voltage signal generating circuit 85. Gate voltage SV1 is thereby generated in synchronism with signal S2, selecting either the automatic mode or the manual mode of operation.

If the automatic mode is selected by the mode selecting switch SW2, the automatic mode operation part including a signal receiving terminal 73 is activated. When a signal SV2 indicating that a specified amount of light has already been emitted, whether from a camera or from another signal-outputting circuit controlling light emission, is received through the terminal 73, it is passed to a transistor circuit including a transistor 74, a resistor 71 and an inversion buffer 75 to be applied to the IGBT 76, switching it off and thereby stopping the emission of light from the discharge tube 69. An output signal from the transistor 74 is also transmitted through another switch SW3 to an indicator circuit 77 for switching on an LED 78 for a few seconds to indicate that an automatic exposure control has been completed, or that a light emission in the selected automatic mode has been completed.

In the manual mode of operation, the photographer can still select whether a full exposure ("M. FULL"), a half exposure ("M. ½") or a quarter exposure ("M. ¼") is desired. If a full exposure is selected through the mode selecting switch SW2, no signal will be inputted to the transistor circuit and the emission of light from the discharge tube 69 is not stopped. If the mode selecting switch SW2 is set for a half or quarter exposure, the manual mode operation part 90 is activated and a corresponding one of its integrating circuits outputs a stop signal with an appropriate timing. The stop signal thus outputted similarly passes through the transistor circuit and the inversion buffer 75 to be inputted to the IGBT 76 to stop the light emission from the discharge tube 69. Because the other switch SW3 is also set to the manual mode of operation, the stop signal generated in the manual mode operation part 90 is not received by the indicator circuit 77 and hence the LED 78 is not lit.

In summary, the prior art mode switching circuit, as explained above with reference to FIG. 5, requires not only the mode selecting switch SW2 but also the other switch SW3 in order to prevent the LED 78 from lighting after the flash lamp is operated in an manual mode. In other words; this extra switch SW3 is necessary for allowing the indicator circuit 77 to function properly such that the LED 78 will light up only after the flash lamp has been operated in the automatic mode. It has been known to integrate the two switches SW2 and SW3 such that they may appear to be a single switch but such a combined switch takes up a large space, both inside and outside the flash lamp housing, becoming a serious problem in the attempt to miniaturizing the flash lamp.

Figure 6:
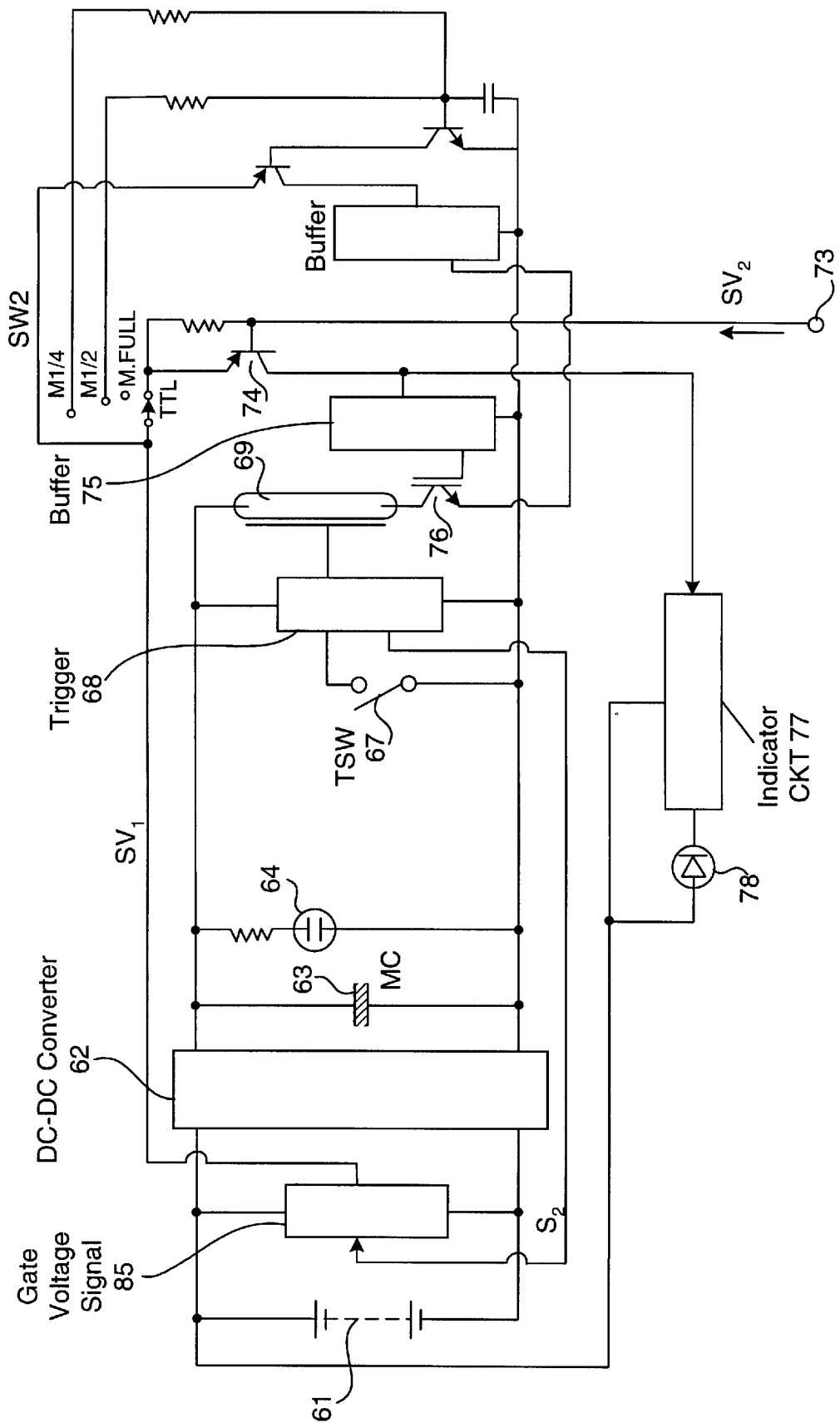
FIG. 6 is a circuit diagram of a mode selecting circuit for a flash lamp for underwater photography embodying this invention.
Figure 7:
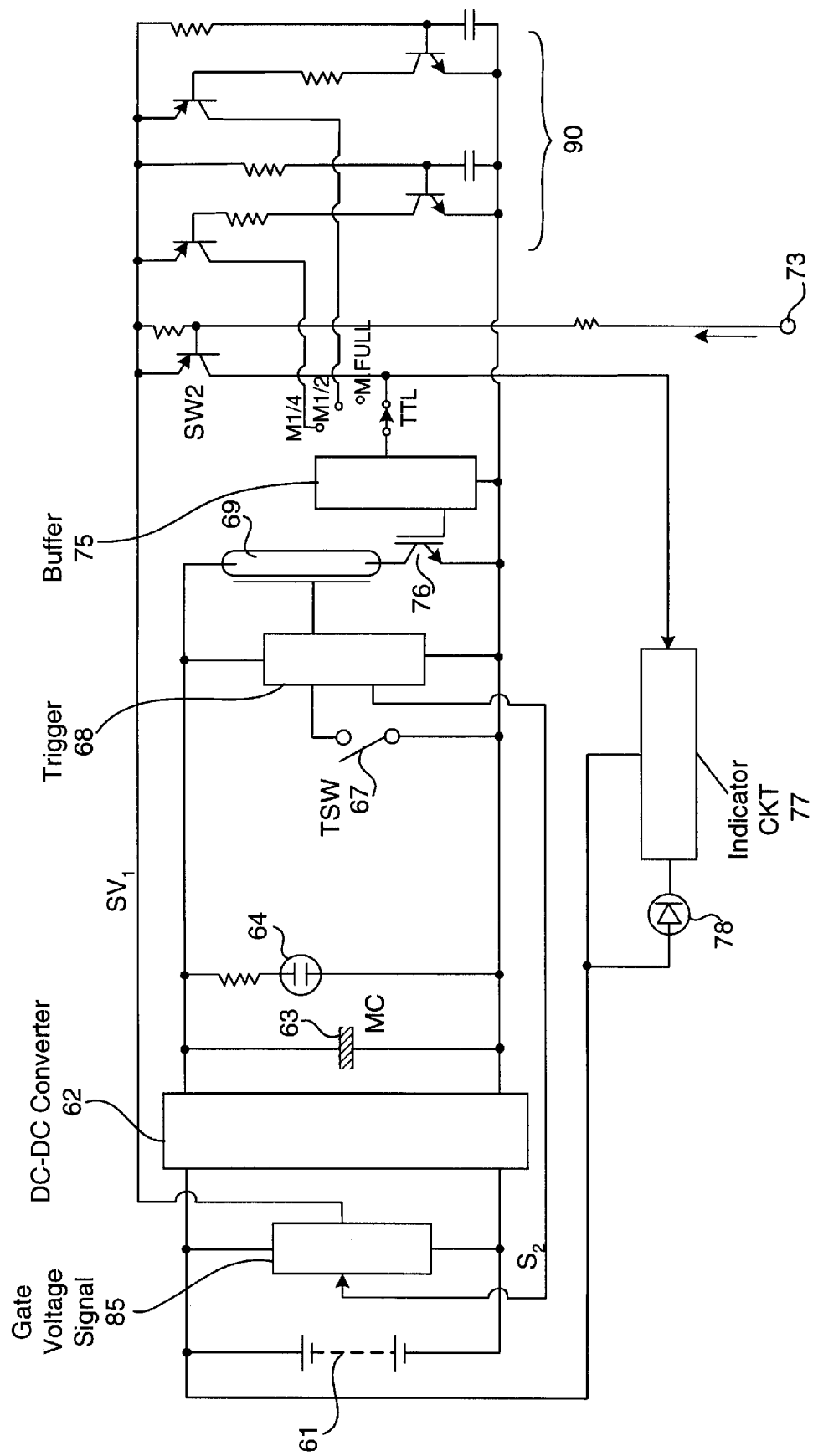
FIG. 7 is a circuit diagram of another mode selecting circuit for a flash lamp for underwater photography embodying this invention.

FIGS. 6 and 7 are circuit diagrams of mode switching circuits embodying this invention for a flash lamp. Since the circuits shown in FIGS. 6 and 7 are very similar to that shown in FIG. 5, like components are therein indicated by the same numerals and not repetitiously described. The circuits of FIGS. 6 and 7 are different from the prior art circuit shown in FIG. 5 in that there is only one switch (the mode selecting switch SW2) to switch between the automatic and manual modes, or that no additional switch is required to activate or not to activate the indicator circuit 77, depending on the selected mode. Explained more in detail structurally, the prior art circuit shown in FIG. 5 required the additional switch SW3 because the circuit was so arranged that the transistor circuit was activated both in the automatic and manual modes. Thus, the circuits of FIGS. 6 and 7 are different in that the mode selecting switch SW2 is not between the signal receiving terminal 73, through which is received a signal indicating that a specified quantity of light has been emitted, and the transistor circuit which outputs a stop signal for switching off the IGBT 76 to stop the light emission from the discharge tube 69. In other words, the prior art mode switching circuit of FIG. 5 is so structured that the stop signal outputted from the transistor circuit passes through the switch SW3 both in the automatic mode and the manual mode of operation, and this was why the switch SW3 had to be operated, together with the mode selecting switch SW2, in order to activate or not to activate the indicator circuit 77, depending on the selected mode of operation. The mode switching circuits shown in FIGS. 6 and 7 are structured such that the stop signal reaches the indicator circuit 77 in the automatic mode of operation without passing through any switch.

Consider the circuit of FIG. 6, for example. As the camera is clicked, whether the automatic or manual mode is selected by the mode selecting switch SW2, the trigger switch TSW 67 activates the trigger circuit 68 and the discharge tube 69 begins to emit light by the power from the main capacitor MC, as explained above with reference to FIG. 5. If the automatic mode of operation (TTC) is selected by the mode selecting switch SW2, the signal received through the terminal 73, when an automatically selected quantity of light has been emitted, passes through the switch SW2 and reaches the inversion buffer 75, stopping the emission of light from the discharge tube 69, as explained above, as well as the indicator circuit 77 to thereby light up the LED 78, indicating that an automatic exposure has been completed. If the camera is clicked while the mode selection switch SW2 is set for the manual half exposure (M. ½) mode, the signal from the gate voltage signal generating circuit 85 serves also to activate the corresponding integrating circuit in the manual mode operation part 90. After the discharge tube 69 starts to emit light, when the quantity of light which has been emitted becomes one half of the total amount of light that can be emitted, the transistor in the integration circuit serves to stop the light emission from the discharge tube 69 but the indicator circuit 77 is unaffected by the operation of the integration circuit. Thus, the LED 78 is not lit after the exposure is completed. It should be clear that the circuit shown in FIG. 7 also functions similarly.

In summary, a mode switching circuit can be made compact and easier to operate according to this invention because a mode switching circuit of this invention relies only on one mode selection switch and there is no need for any additional switch in order to prevent the LED 78 for indicating the completion of light emission in the automatic mode of operation from making a false indication.

Figures 8, 8A:
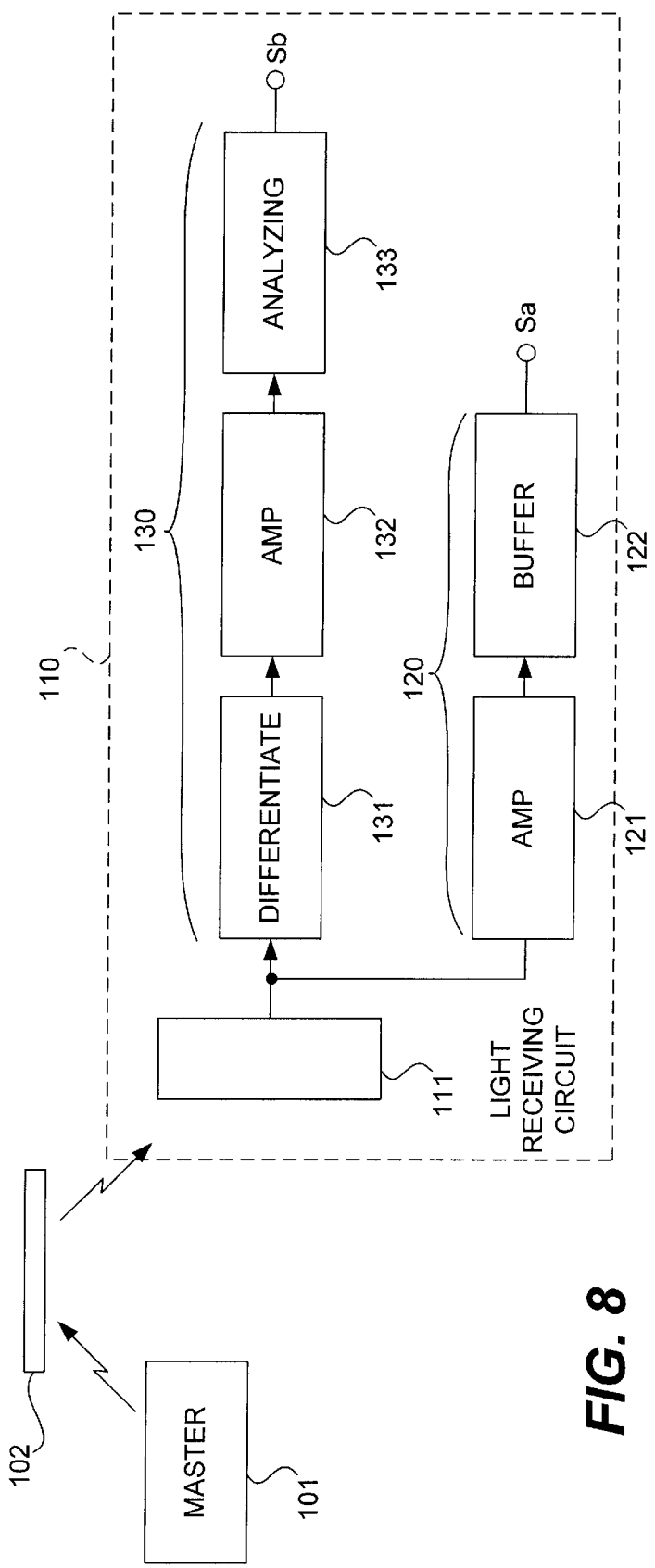
FIG. 8 is a block diagram of a control circuit to be incorporated in a flash lamp of a slave type embodying this invention.
FIG. 8A is a portion of FIG. 8 when the circuit is adapted to receive a light signal in an alternative manner.

A control portion of a flash lamp of the slave type embodying this invention will be described next by way of examples. FIG. 8 shows a control circuit 110 characterized as including a light receiving circuit 111, a start signal output circuit 120 for outputting a start signal Va and a stop signal output circuit 130 for outputting a stop signal Vb. The start signal output circuit 120 includes an AC amplifier circuit 121 for amplifying the AC part and a buffer 122, and the stop signal output circuit 130 includes a differential circuit 131, an AC amplifier circuit 132 for amplifying the AC part and a signal analyzing circuit 133. As flash light emitted from another flash lamp 101 serving as the master to this slave lamp is reflected by an object 102 and is received by the light receiving circuit 111, the control circuit 110 analyzes the light sensing signal outputted from the light receiving circuit 111 in response to control the light emission from the slave lamp. The amplifier circuit 121 amplifies the AC part of the light sensing signal and the buffer 122 outputs a start signal for starting to emit light. The light sensing signal is also differentiated by the differential circuit 131 of the stop signal output circuit 130 and, after the AC part (the differential part) of the differentiated light sensing signal is amplified, the negative voltage of the amplified light sensing signal is discriminated, a stop signal element is further discriminated from this negative voltage and is outputted as a stop signal Vb.

Figure 9:
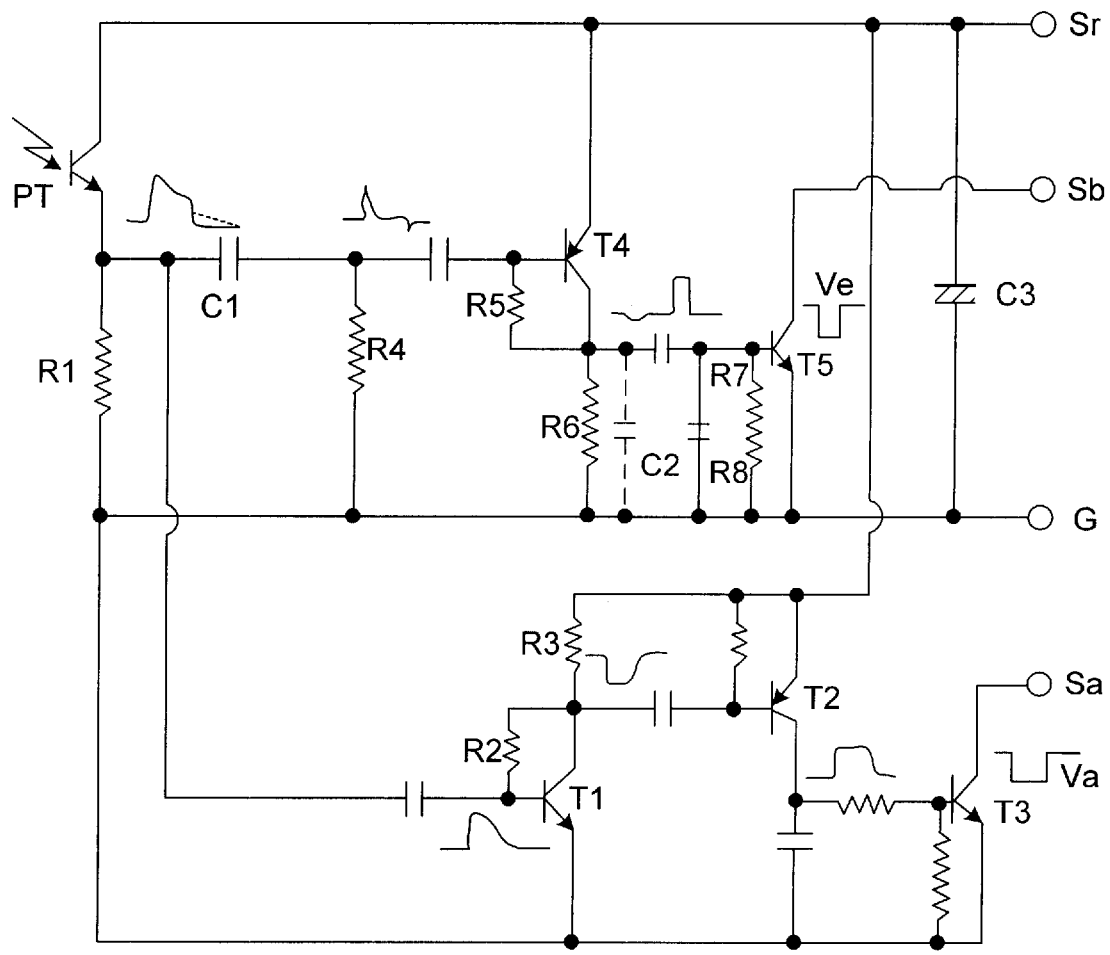
FIG. 9 is a circuit diagram of the control circuit shown in FIG. 8.

FIG. 9 is a circuit diagram of the control circuit 110 described by the block diagram of FIG. 8, adapted to apply a voltage through a ready signal terminal Sr to be described below and a grounding terminal G. The light receiving circuit 111 of FIG. 8 is formed with a phototransistor PT serving as the light receiving element and a load resistor R1. The start signal output circuit 120 of FIG. 8 includes the AC amplifier circuit 121 formed with an NPN-type transistor T1, a bias resistor R2 and a load resistor R3 and the buffer 122 formed with transistors T2 and T3. The stop signal output circuit 130 of FIG. 8 includes the differential circuit 131 formed with a capacitor C1 and a resistor R4, the AC amplifier circuit 132 formed with a PNP-type transistor T4, a bias resistor R5 and a load resistor R6 and the signal analyzing circuit 133 formed with a bypass capacitor C2 for preventing noise, a transistor T5, a base resistor R7 and a bias resistor R8. In FIG. 9, C3 is a capacitor inserted between the ready terminal Sr and the grounding terminal G for stabilizing the circuit voltage and the dotted line indicates the manner in which the bypass capacitor C2 may alternatively be connected. The bypass capacitor C2 on the output side of the amplifier circuit 132 serves to bypass the noise components in light sensing signals and to thereby prevent erroneously stopping the emission of light. Since the noise components have high frequencies, the bypass capacitor C2 may be a capacitor with small capacitance and does not affect the intended operations of the circuit.

Ordinary AC amplifiers may be used as the AC amplifiers 121 and 132 but the transistor T1 of the start signal output circuit 120 is of the NPN type while the transistor T4 of the stop signal output circuit 130 is of the PNP type. Thus, the transistor T1 amplifies the plus sides of signals more strongly while the transistor T4 amplifies the minus sides of signals more strongly. In other words, the amplifier circuit 121 of the start signal output circuit 120 for outputting start signals Va serves to amplify the plus side of the light sensing signal while the amplifier circuit 132 of the stop signal output circuit 130 for outputting stop signals Ve serves to amplify the minus side of the differential signals which eventually becomes the stop signal. This is because there is no problem caused by such distorted manners of amplification. In the present application, what is important is the amplification. As long as the timing is correct and not distorted, stronger amplifications are preferable and there is no reason in the instant application to amplify both the plus and minus sides. In summary, the signals amplified by the two amplifier circuits 121 and 132 are mutually opposite in polarity and it is necessary to amplify only one side (plus or minus) of each. It is finally to be noted that ordinary AC voltage amplifiers may be used for the amplifier circuits 121 and 132.

The signal analyzing circuit 133 is for analyzing a received voltage signal to detect a "stop signal element" and to thereby output a stop signal. The signal analyzing circuit 133 serves also to cut off voltage signals which may turn into an error-causing signal. This will be explained more in detail below.

Figure 10A:
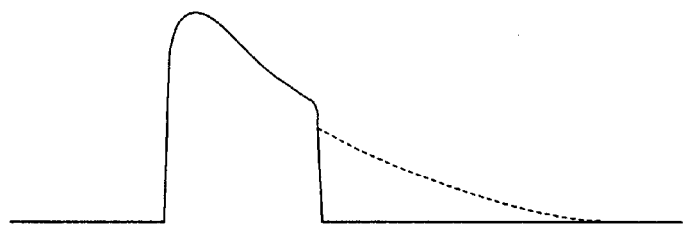
FIG. 10 is a waveform diagram for the signals transmitted through the start signal output circuit of FIGS. 8 and 9.
Figure 10A:
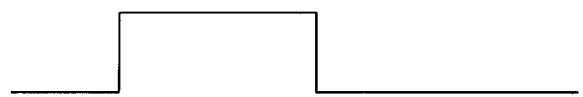
Figure 10B:
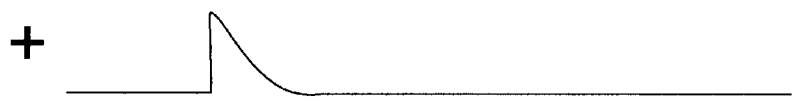
Figure 10C:
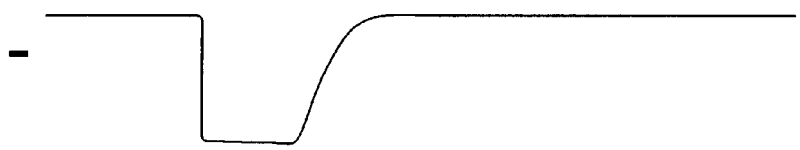
Figure 10D:
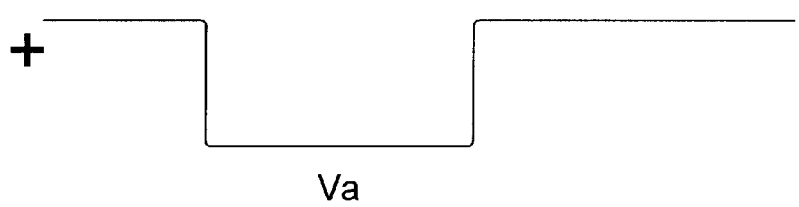

Next, overall operations of the control circuit 110 will be explained with reference to the waveform diagrams of FIGS. 10 and 11. As the light receiving element PT receives light from a master flash lamp, say, with a waveform as shown in FIG. 10(A), the light receiving circuit 111 generates a light sensing signal by the photoelectric effect through the load resistor R1. The light sensing signal thus generated is inputted to the start signal output circuit 120 and is amplified by the transistor T1 of the amplifier circuit 121. In this amplification, the plus side of the light sensing signal as shown in FIG. 10(B) is inputted and an amplified signal obtained by inverting the light sensing signal as shown in FIG. 10(C) is outputted. The light sensing signal, thus amplified, is inverted by the buffer 122 with the transistors T2 and T3 and is outputted as the start signal Va shown in FIG. 10(D).

As will be mentioned below, the light receiving element PT of the light receiving circuit 111 need not be adapted to receive only the reflected light. As shown schematically in FIG. 8A, a portion of the flash light emitted from the master may be directly communicated through an optical cable 115 or the like to the light receiving element PT, or the master may be adapted to transmit a signal light, say, through the optical cable 115 from an LED, a light bulb (if the startup is quick enough), or a laser (not shown) in synchronism with the emission of its flash light such that the light receiving element PT of the slave is sure to recognize the emission of light from the master. FIG. 10(A') shows the waveform of a light signal transmitted from such an LED associated with the master flash lamp.

Figure 11A:
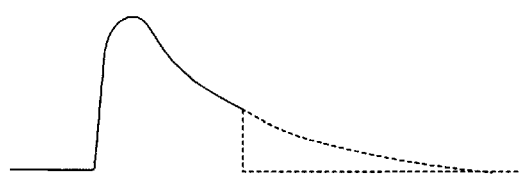
FIG. 11 is a waveform diagram for the signals transmitted through the stop signal output circuit of FIGS. 8 and 9.
Figure 11B:
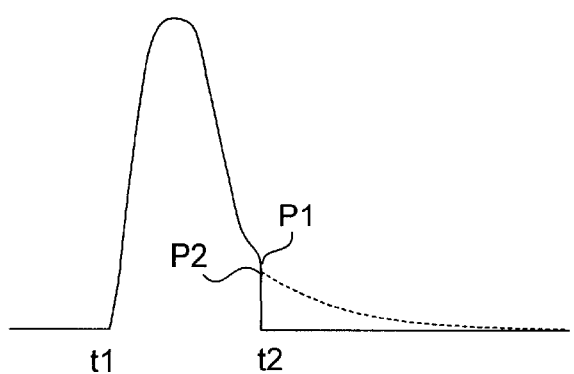

FIG. 11(A) is the waveform of the light outputted from the slave, and FIG. 11(B) shows the waveform of the reflected light which is received by the light receiving element PT both from the master and the slave itself. When the master flash lamp stops emitting light, the slave is still emitting light but the light receiving element PT immediately notices the sudden drop in the intensity of the total light being received.

Figure 11C:
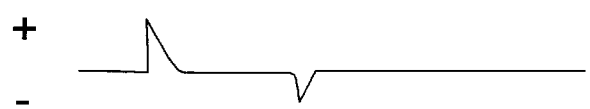
Figure 11D:
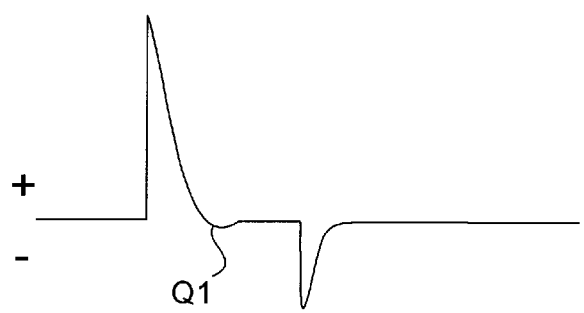

The light sensing signal from the light receiving circuit 111, incorporating this sudden drop in the total light intensity, is inputted to the stop signal output circuit 130 and is differentiated by the differential circuit 131 with the capacitor. C1 and the resistor R4. The differentiated signal, as shown in FIG. 11(C) (and in FIG. 11(D) in an enlarged form), is transmitted to the AC amplifier circuit 132. The time at which the master starts flashing is indicated as t1 and the time for stopping the light emission is indicated as t2. Although it is not easily seen in FIG. 11(B), when the master stops emitting light, the slave is still continuing to emit light, although not at its peak intensity. Thus, the change in intensity of light received by the light receiving element is smaller at this moment than at t1 when both the master and the slave nearly simultaneously begin to illuminate the light-reflecting object. This is why the differential signal at t2, from which the stop signal is to be generated, is smaller as shown in FIGS. 11(C) and 11(D).

Figure 11E:
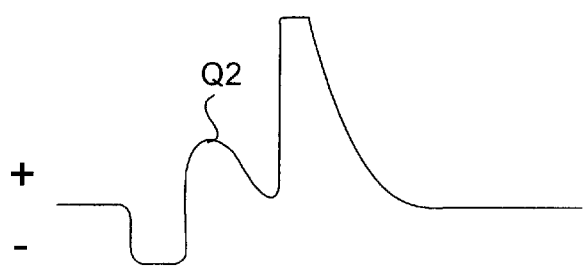
Figure 11F:
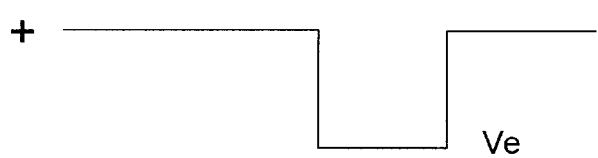

The differential signal thus obtained is amplified by the amplifier circuit 32 with the transistor T4. As a result, as shown in FIG. 11(E), not only is the signal inverted but the minus side of the signal is more strongly amplified. The amplified signal is transmitted to the signal analyzing circuit 133 with the transistor T5 to separate out a portion from the plus side of the voltage signal shown in FIG. 11(E). The separated signal has a waveform as shown in FIG. 11(F), from which the stop signal Ve is generated and outputted. It is to be noted that there is no base resistor connected to the transistor T4 in order to amplify the plus side of the differential signal weakly and the minus side of the differential signal strongly.

As explained above, the differential circuit 131 outputs a plus differential signal at time T1 when the light emission is started and a minus differential signal at time T2 when the light emission is stopped. Since the rate of light emission from the master decreases gradually after it reaches its peak, the differential circuit 131 also outputs a weakly negative differential signal Q1. This weakly negative differential signal Q1 becomes a significantly strong positive signal, as shown at Q2 in FIG. 11(E), after being amplified by the AC amplifier circuit 132. Since the amplification by the transistor T4 is about 200–400, this amplified differential signal Q2 may be about 1V–2V. In order not to generate the stop signal Ve on the basis of this amplified differential signal Q2, the signal analyzing circuit 133 serves to "cut" this signal voltage Q2. Explained more in detail, a DC amplifier transistor is used as the transistor T5 of the voltage classifying circuit 133 such that it will not respond to the input of this signal voltage Q2. When the signal voltage Q2 becomes relatively too large, resistors may be used to divide this voltage or a diode may be connected to the base of the transistor T5 to raise the action voltage. The amplification of the transistor. T4 of the amplifier circuit 132 may also be adjusted appropriately to control the level of the signal voltage Q2.

Figure 12:
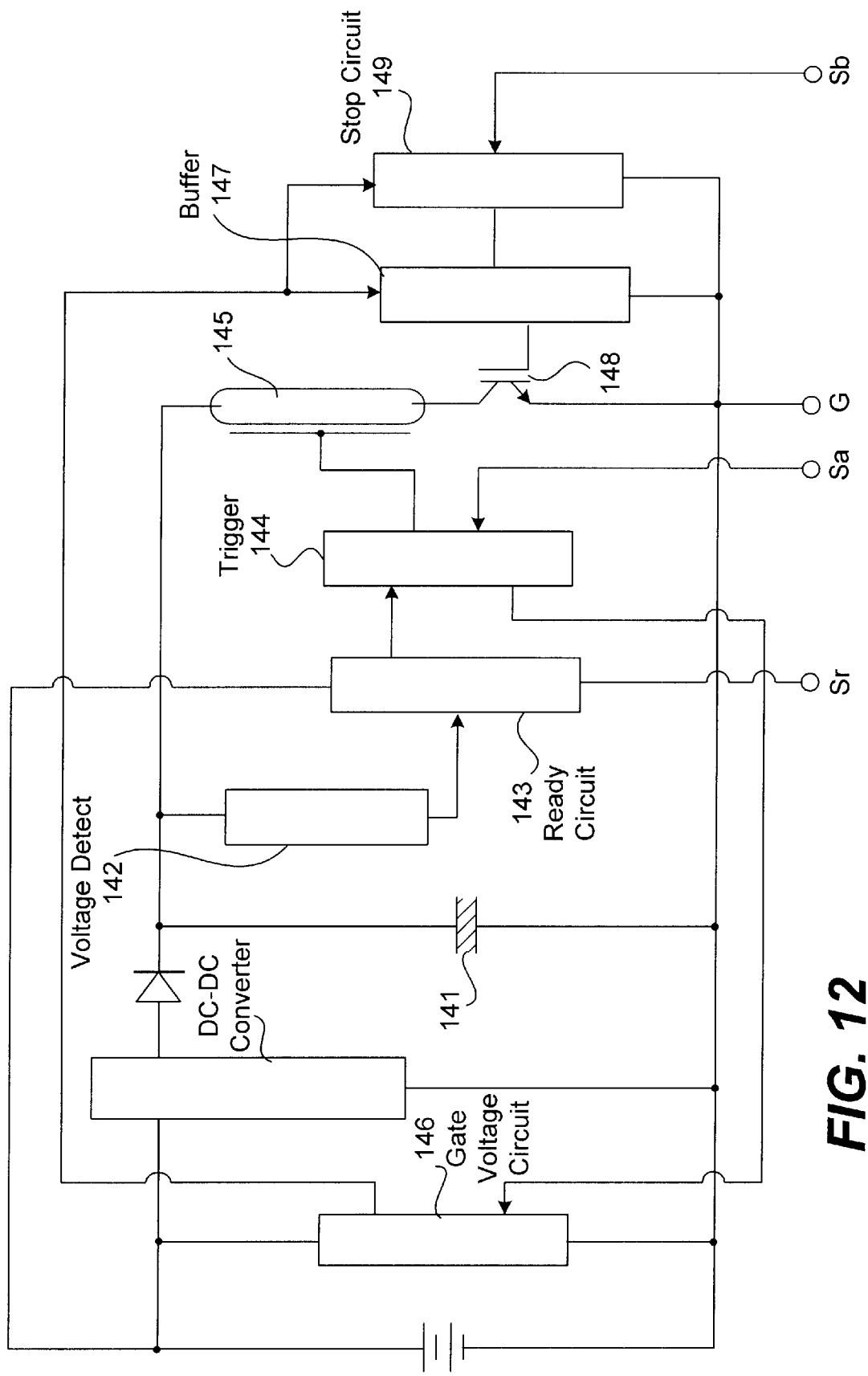
FIG. 12 is a block diagram showing the circuitry of the slave lamp incorporating the control circuit of FIGS. 8 and 9.

FIG. 12 is a block diagram of the entire circuitry of a slave lamp incorporating the control circuit 110 explained above. The terminals Sa, Sb, Sr and G shown in FIG. 9 are to be connected to the correspondingly indicated terminals shown in FIG. 12.

Numeral 141 indicates a main capacitor of the lamp. As it is charged to a predetermined voltage, this is detected by a voltage detecting circuit 142 and a ready circuit 143 responds to a detection signal therefrom and outputs a ready signal Sr. The ready signal Sr is inputted to the output circuit 110 and the output circuit 110 is now in a charged condition. If the master lamp 101 emits light under this condition and it is received by the light receiving circuit 111, the start signal Sa is outputted from the start signal output circuit 120, as explained above, and a trigger circuit 144 is thereby activated. As the trigger circuit 144 is activated, a high-voltage pulse is applied to a xenon discharge tube 145 for its excitation. The trigger circuit 144 also serves to activate a gate voltage circuit 146, and a gate voltage is applied as a high voltage to the gate of an IGBT 148, setting the IGBT 148 in the ON-condition. As a result, the xenon discharge tube 145 begins to emit light under the fully charged voltage of the main capacitor 141.

As the master stops its light emission (say, when it is determined that the object 102 has been appropriately exposed, if the camera is being operated in an automatic mode), the stop signal output circuit 130 outputs a stop signal Ve in response to a detected change in the reflected light from the object 102. The stop signal Ve is transmitted to a light stopping circuit 149, which responds thereto by applying a low voltage to the gate of the IGBT 148 through a buffer 147, causing the xenon discharge tube 145 to stop emission of light.

Figure 13:
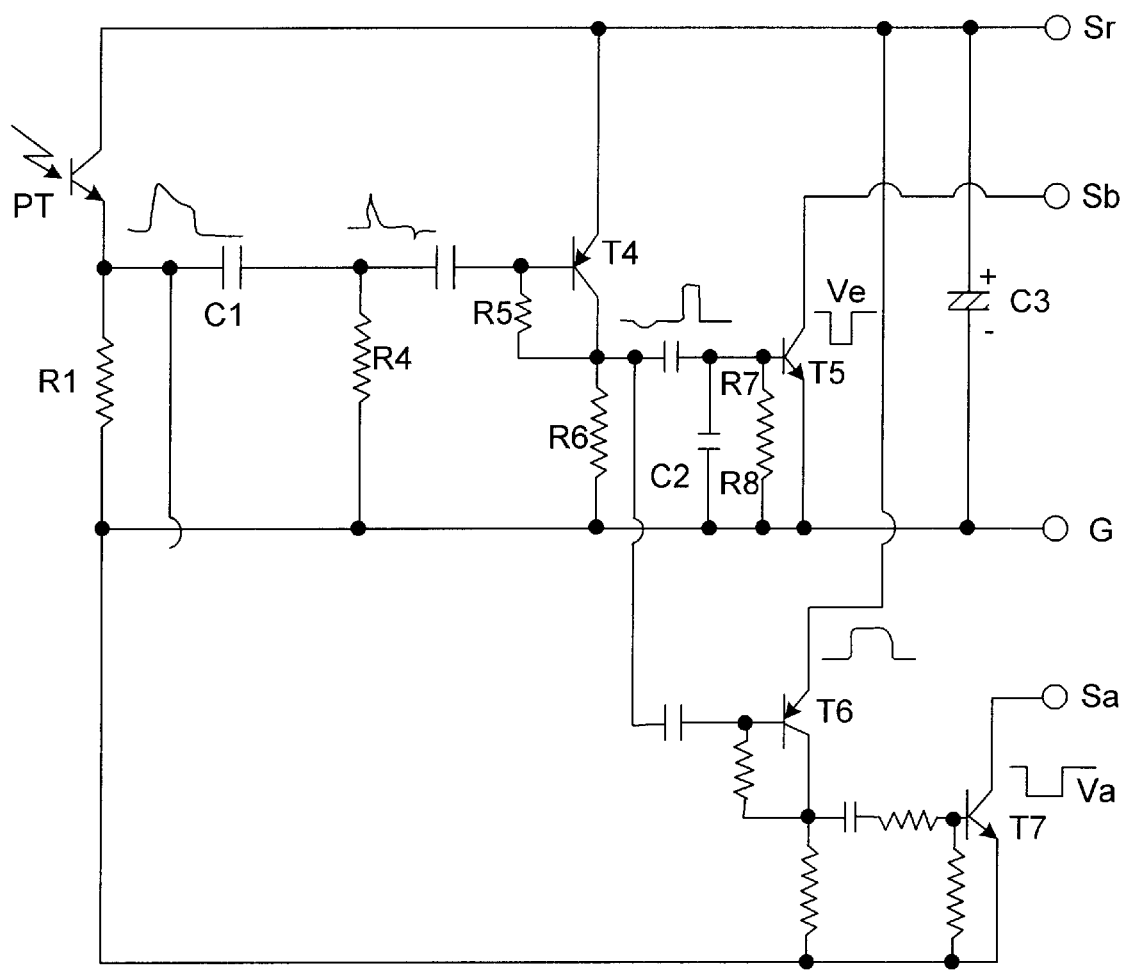
FIG. 13 is a circuit diagram of another control circuit embodying this invention.
Figure 14A:
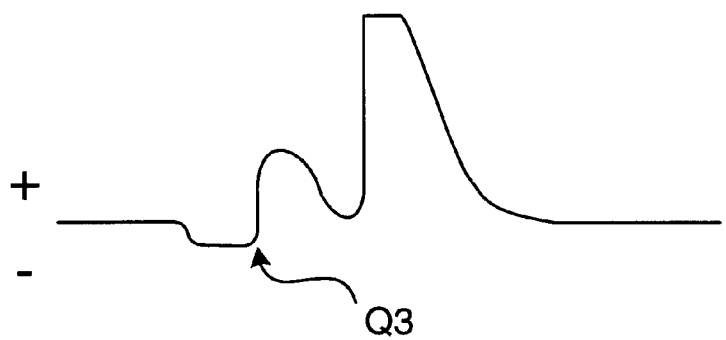
FIG. 14 is a waveform diagram of signals transmitted through the control circuit of FIG. 13.
Figure 14B:
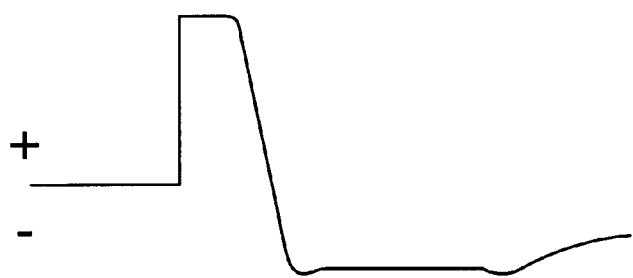
Figure 14C:
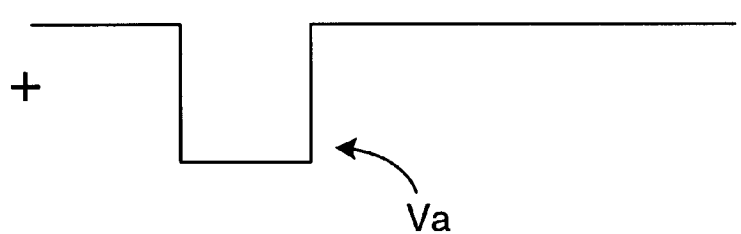

FIG. 13 shows another circuit structure for the control circuit 110, characterized wherein a start signal element is detected from the output part of the transistor T4 of the stop signal output circuit 130. Explained more in detail, since the amplified output from the transistor T4 is as shown in FIG. 14(A) (as explained above with reference to FIG. 11 (E)), the output signal thus shaped is inputted to a transistor T6 of the PNP type in the start signal output circuit 120 adapted to amplify the minus side of an inputted signal. As a result, the minus side of the amplified signal from the transistor T4 (indicated as Q3) in inverted and amplified, as shown in FIG. 14(B), and this is further inverted by another transistor T7 to output the start signal Va, as shown in FIG. 14(C). The stop signal Ve is outputted from the stop signal output circuit 130, as explained above.

Such a circuit structure is useful for a slave for use where the reflected light of the master from the object is weak such as when the distance between the master and the object is large and the reflected light may not be strong enough to activate the slave, or to cause the start signal to be outputted. In a situation like this, there is actually no need to output the stop signal Ve to forcibly stop the light emission from the master while it is necessary to increase the output sensitivity for the start signal. This is why the amplifier circuit for this output circuit is of a two-stage structure with two transistors T4 and T6.

It is possible to amplify the light sensing signal from the light receiving circuit in an amplifier circuit in two stages, instead of taking it from the transistor T4 of the stop signal output circuit 130, to output the start signal Va. This is not preferable, however, because the number of necessary components increases and so does the space required for their installation.

Figure 15:
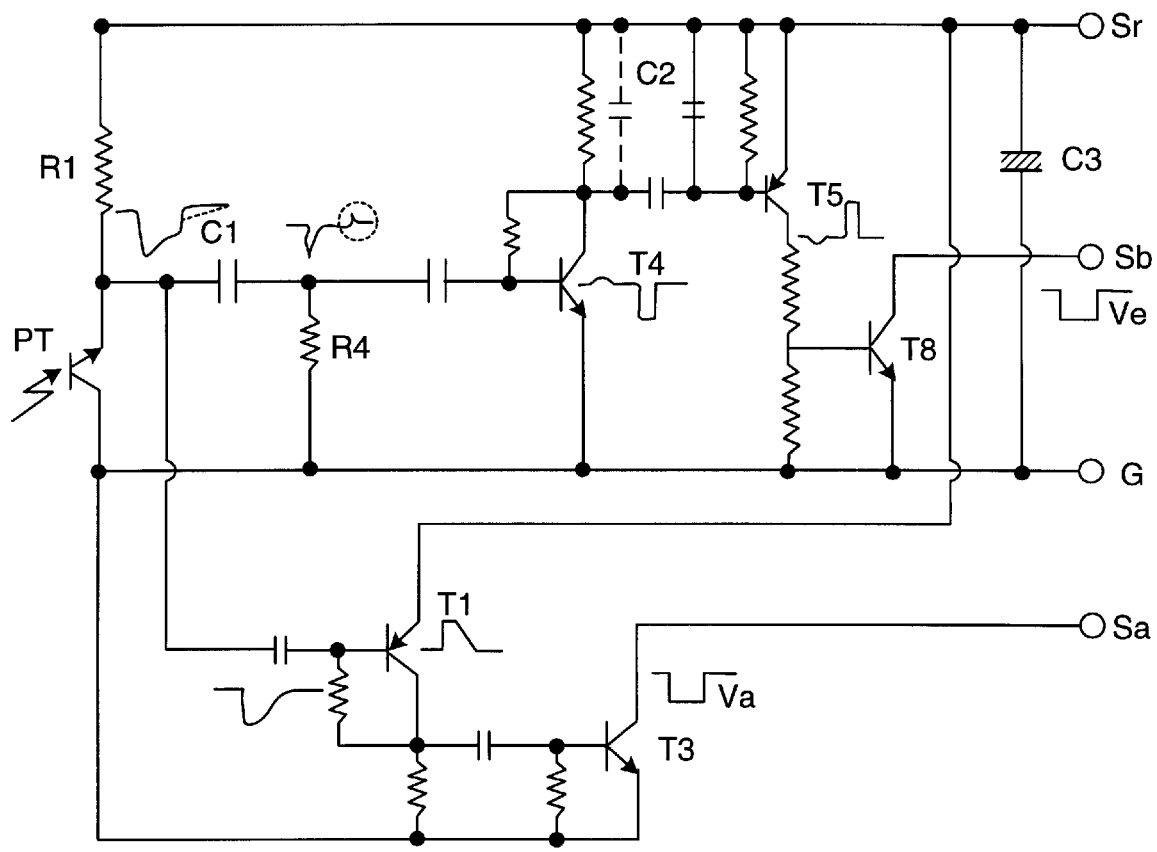
FIG. 15 is a circuit diagram of still another control circuit embodying this invention.

FIG. 15 shows still another circuit structure for the control circuit 110, characterized wherein a load resistor R1 is connected to the collector side of the light receiving element PT and wherein the polarity of each of the transistors is reversed from that of FIG. 9. The transistor T8 shown in FIG. 15 is for the purpose of inverting signals.

The control circuit 110 shown by the block diagram of FIG. 8 is characterized in that both start and stop signal elements are detected from the light sensing signal from the same light receiving circuit and hence that two AC amplifiers 121 and 132 are required for the start and stop signal output circuits 120 and 130. In other words, the light receiving element PT of the light receiving circuit 111 keeps receiving reflected light both from the master and from the slave. For this reason, the resistance value of the load resistor R1 must be made appropriately small in order to prevent the light receiving element PT from becoming saturated. As a result, the level of received light by the light receiving circuit 111 cannot be freely made higher, and this is why there is a need for the amplifier circuits 121 and 132.

FIG. 16 shows a control circuit of another structure characterized as having two light receiving circuits 111A and 111B associated respectively with the start and stop signal output circuits 120 and 130, each of the light receiving circuits 111A and 111B being structured similarly to the light receiving circuit 111 described above with a light receiving element and a load resistor. With a control circuit thus structured, the load resistance may be increased because there is no problem if the light receiving element for the start signal output circuit 120 becomes saturated after the start signal Va has been outputted. As a result, the received light level of the light receiving circuit 111A for the start signal output circuit 120 may be made higher and hence the amplifier circuit 121 may be dispensed with, as shown by dotted line in FIG. 16, thereby transmitting the light sensing signal directly to the buffer 122 to output the start signal Va. In such an application, the buffer 122 may operate so as to input the light sensing signal from the light receiving circuit 111a through a capacitor by the base of a transistor and to have the start signal Va outputted through the collector of this transistor. It is also possible to input the light sensing signal from the light receiving circuit 111a through a capacitor by the gate of a silicon controlled rectifier SCR and to have the start signal Va outputted by the transmission through this SCR. The buffer 122 for this purpose need not serve as an amplifier, although the amplifier circuit 132 is necessary in the stop signal output circuit 130 because the level of received signals for the second light receiving circuit 111b cannot be made sufficiently high.

As explained with reference to FIG. 8A, the two light receiving circuits 111a and 111b of FIG. 16 may be each adapted to receive a portion of the flash light emitted from the master through an optical cable 115, as shown in FIG. 16A. The optical cable 115 may alternatively be adapted to transmit light from an LED (not shown), as explained above with reference to FIG. 8A.

When two light receiving circuits 111a and 111b are incorporated, as shown in FIGS. 16 and 16A, two light receiving elements may be used separately or within a single package. If photodiodes are used as light receiving elements, as frequently done, however, the start and stop signal output circuits 120 and 130 both will need an amplifier circuit because the light sensing signals may be weak.

Although only a small number of block diagrams have been disclosed above, many modifications and variations are possible within the scope of the invention. Although it is advantageous to use transistors (such as T1 and T4) in the amplifier circuits 121 and 132 because the number of components to be assembled is limited, use may equally well be made of operational amplifiers for the same purposes. In such a case, use may also be made of an AC inversion amplifier or an AC non-inversion amplifier for the purpose of amplification. Although examples were shown wherein the control circuit 110 is incorporated in a slave lamp, a device incorporating the control circuit 110 may be formed separately and detachably attached to the slave lamp for use. Such a device will also have Sr, G, Sa and Sb terminals externally to be connected to corresponding terminals provided on the external surface of the slave lamp. With a slave structured as explained above, signals are more accurately and reliably outputted and since the control circuit is of a simple structure, the production cost of such slaves can also be made lower.

It is particularly to be noted, as remarked above with reference to FIGS. 8A and 16A, that the emission of light from a master may be communicated directly to a slave, say, through an optical cable connecting them. A portion of the flash light emitted from the master may be diverted and communicated through such a cable to the slave. If the master is provided with an LED adapted to emit light when the master is switched on to start emitting flash light, and if the emitted light from such an LED is communicated through the optical cable to the slave, the slave may be activated more reliably, without depending upon the environmental condition which may adversely affect the reflection of light by an intended target object.

It is further to be noted in connection with the disclosure given above with reference to FIGS. 5–7 that the indicator circuit 77 need not function to light up the LED 78 at the completion of light emission in an automatic mode of operation. The circuitry may be so designed that the LED 78 will light up to indicate that the automatic mode circuit did not function, rather than that it has functioned. In summary, the indicator circuit 77 and the LED 78, broadly explained, serve to indicate whether the light emission in the automatic mode of operation has taken place or not.

What is claimed is:

1. A flash lamp for underwater photography, said flash lamp comprising:
    a panel;
    at least two flash light emitting straight discharge tubes mounted to said panel, each having a reflector for reflecting flash light emitted therefrom;
    electronic means for discharging said discharge tubes to cause emission of flash light; and
    a watertight housing containing said panel, said discharge tubes and said electronic means therein;
    wherein said at least two light emitting units are disposed such that the straight discharge tubes thereof are oriented perpendicularly to each other and illuminate a circular target area on a plane parallel to said panel.

2. The flash lamp of claim I wherein said discharge tubes are disposed on said panel in a T-shaped formation.

3. The flash lamp of claim I wherein said electronic means include a plurality of transformers connected mutually in parallel.

4. The flash lamp of claim I wherein said electronic means include a plurality of capacitors connected mutually in parallel for discharging said discharge tubes.

5. A flash lamp for underwater photography, said flash lamp comprising:
    a panel and at least one circuit board disposed parallel to each other in a layered formation one behind the other;
    discharge tubes for emitting flash light;
    electronic means for discharging said discharge tubes to cause emission of flash light; and
    a watertight housing containing said panel, said discharge tubes and said electronic means therein, said discharge tubes and said electronic means being mounted to said panel and said at least one circuit board.

6. The flash lamp of claim 5 wherein said electronic means include a plurality of transformers connected mutually in parallel.

7. The flash lamp of claim 5 wherein said electronic means include a plurality of capacitors connected mutually in parallel for discharging said discharge tubes.

8. A flash lamp for underwater photography, said flash lamp comprising:
    light emitting means for emitting flash light;
    electronic means for discharging said light emitting means to cause emission of flash light therefrom; and
    a watertight housing containing said light emitting means and at least a portion of said electronic means therein;
    wherein said electronic means include:
        an automatic control circuit;
        a manual control circuit;
        a mode selection switch for selectively activating said automatic control circuit for an automatic mode of operation and said manual control circuit for a manual mode of operation; and
        indicating means for making an indication whether or not emission of light from said light emitting means in said automatic mode has been completed;
    wherein said automatic control circuit outputs a first stop signal in said automatic mode of operation for stopping light emission from said light emitting means, said first stop signal being transmitted to said indicating means without passing through any switch and causing said indicating means to make said indication.

9. The flash lamp of claim 8 wherein said automatic mode of operation is wherein said first stop signal is transmitted when said electronic means receive an exposure completing signal which indicates that said light emitting means has emitted an automatically determined quantity of light, and wherein said manual mode of operation is wherein said second stop signal is transmitted from said manual control circuit when a specified quantity of light selected manually has been emitted from said light emitting means.

10. A slave flash lamp comprising:
    light receiving means for receiving light from a master flash lamp and outputting a light sensing signal according to the received light; and
    signal processing means for processing said light sensing signal and thereby causing said slave flash lamp to start emission of light and to stop said emission of light, said signal processing means including stop signal outputting means which comprise:
        differentiating means for differentiating said light sensing signal and thereby outputting differentials of said light sensing signal;
        amplifying means for amplifying said differentials of the differentiated light sensing signal; and
        signal analyzing means for analyzing the amplified differentials, detecting a stop signal element in said light sensing signal and thereby outputting a stop signal for stopping said emission of light from said slave flash lamp.

11. The slave flash lamp of claim 10 wherein said signal processing means further includes start signal outputting means for amplifying said light sensing signal, analyzing the amplified light sensing signal, detecting a start signal element in said light sensing signal and thereby outputting a start signal for starting said emission of light from said slave flash lamp.

12. The slave flash lamp of claim 10 wherein said stop signal outputting means include a bypass capacitor connected to output side of said amplifying means of said stop signal outputting means for suppressing noise.

13. The slave flash lamp of claim 10 further comprising:
    light emitting means for emitting flash light;
    electronic means for discharging said light emitting means to cause emission of flash light therefrom; and
    a watertight housing containing said light emitting means and at least a portion of said electronic means therein;
    wherein said light receiving means and signal processing means are detachably attachable to said housing.

14. The slave flash lamp of claim 11 further comprising:
    light emitting means for emitting flash light;
    electronic means for discharging said light emitting means to cause emission of flash light therefrom; and
    a watertight housing containing said light emitting means and at least a portion of said electronic means therein;
    wherein said light receiving means and signal processing means are detachably attachable to said housing.

15. The slave flash lamp of claim 12 further comprising:

light emitting means for emitting flash light;

electronic means for discharging said light emitting means to cause emission of flash light therefrom; and a watertight housing containing said light emitting means and at least a portion of said electronic means therein;

wherein said light receiving means and signal processing means are detachably attachable to said housing.

16. A slave flash lamp comprising:

first light receiving means and second light receiving means each for receiving light from a master flash lamp and outputting a light sensing signal according to the received light; and signal processing means for processing said light sensing signal and thereby causing said slave flash lamp to start emission of light and to stop said emission of light, said signal processing means including start signal outputting means and stop signal outputting means, said start signal outputting means processing the light sensing signal from said first light receiving means, detecting a start signal element in said light sensing signal and thereby outputting a start signal for starting said emission of light from said slave flash lamp, said stop signal outputting means comprising:

differentiating means for differentiating the light sensing signal from said second light receiving means and thereby outputting differentials of said light sensing signal;

amplifying means for amplifying said differentials of the differentiated light sensing signal; and signal analyzing means for analyzing the amplified differentials, detecting a stop signal element in said light sensing signal and thereby outputting a stop signal for stopping said emission of light from said slave flash lamp.

17. The slave flash lamp of claim 16 wherein said signal processing means include a bypass capacitor on output side of said amplifying means of said stop signal outputting means for suppressing noise.

18. The slave flash lamp of claim 16 further comprising:

light emitting means for emitting flash light;

electronic means for discharging said light emitting means to cause emission of flash light therefrom; and a watertight housing containing said light emitting means and at least a portion of said electronic means therein;

wherein said light receiving means and signal processing means are detachably attachable to said housing.

19. The slave flash lamp of claim 17 further comprising:

light emitting means for emitting flash light;

electronic means for discharging said light emitting means to cause emission of flash light therefrom; and a watertight housing containing said light emitting means and at least a portion of said electronic means therein;

wherein said light receiving means and signal processing means are detachably attachable to said housing.

* * * * *